(12) United States Patent
Gmeiner et al.

(10) Patent No.: US 11,426,926 B2
(45) Date of Patent: Aug. 30, 2022

(54) METHOD AND DEVICE FOR THE LITHOGRAPHY-BASED ADDITIVE MANUFACTURE OF THREE-DIMENSIONAL MOLDED BODIES

(71) Applicant: CUBICURE GMBH, Vienna (AT)

(72) Inventors: Robert Gmeiner, Vienna (AT); Thomas Förster-Romswinckel, Vienna (AT); Philipp Neubauer, Weissenbach (AT)

(73) Assignee: CUBICURE GMBH, Vienna (AT)

( * ) Notice: Subject to any disclaimer, the term of this patent is extended or adjusted under 35 U.S.C. 154(b) by 0 days.

(21) Appl. No.: 16/622,566

(22) PCT Filed: Jun. 8, 2018

(86) PCT No.: PCT/AT2018/000052
§ 371 (c)(1),
(2) Date: Dec. 13, 2019

(87) PCT Pub. No.: WO2018/232428
PCT Pub. Date: Dec. 27, 2018

(65) Prior Publication Data
US 2021/0146608 A1 May 20, 2021

(30) Foreign Application Priority Data
Jun. 19, 2017 (EP) .................................. 17450006

(51) Int. Cl.
*B29C 64/124* (2017.01)
*B29C 64/214* (2017.01)
(Continued)

(52) U.S. Cl.
CPC .......... *B29C 64/124* (2017.08); *B29C 64/214* (2017.08); *B29C 64/232* (2017.08);
(Continued)

(58) Field of Classification Search
None
See application file for complete search history.

(56) References Cited

U.S. PATENT DOCUMENTS 1,921,953 A * 8/1933 Stephens ............... B29C 48/914
425/224
5,192,559 A * 3/1993 Hull ...................... B29C 64/188
425/89

(Continued)

FOREIGN PATENT DOCUMENTS

WO 2010/045951 A1 4/2010

OTHER PUBLICATIONS

International Search Report dated Oct. 11, 2018 issued in corresponding International Application PCT/AT2018/000052 (4 pgs.).
(Continued)

*Primary Examiner* — Matthew J Daniels
*Assistant Examiner* — Paul Spiel
(74) *Attorney, Agent, or Firm* — Pillsbury Winthrop Shaw Pittman LLP

(57) ABSTRACT

A method for the lithography-based additive manufacture of three-dimensional molded bodies, in which a build platform is positioned at a distance from a material support, which is permeable to the radiation of a radiation source at least in some areas, for a material solidifiable by exposure to said radiation, wherein the material support is translationally moved between a first position and a second position, characterized in that material is applied with a defined layer thickness during the movement of the material support from the first position to the second position, after this the applied material, between the build platform and the material support, is location- and/or time-selectively irradiated by the radiation source and solidified, and subsequently material is removed from the material support during the movement of (Continued)

Figure 1:
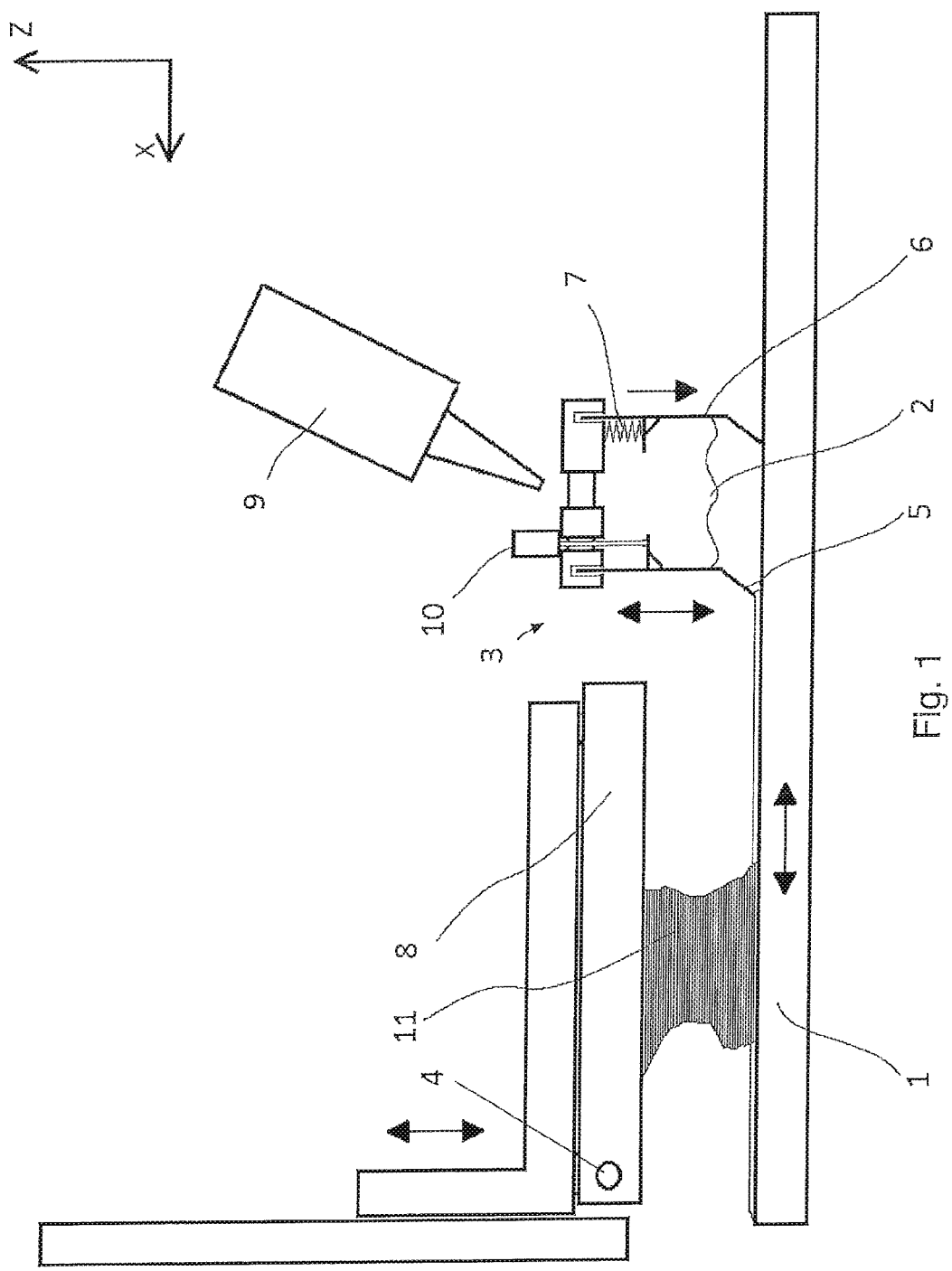

the material support from the second position to the first position.

16 Claims, 2 Drawing Sheets

(51) Int. Cl.
*B29C 64/264* (2017.01)
*B29C 64/232* (2017.01)
*B29C 64/245* (2017.01)
*B29C 64/40* (2017.01)
*B33Y 10/00* (2015.01)
*B33Y 30/00* (2015.01)
*B29C 64/357* (2017.01)
*B29C 64/255* (2017.01)

(52) U.S. Cl.
CPC .......... *B29C 64/245* (2017.08); *B29C 64/255* (2017.08); *B29C 64/264* (2017.08); *B29C 64/357* (2017.08); *B29C 64/40* (2017.08); *B33Y 10/00* (2014.12); *B33Y 30/00* (2014.12)

(56) References Cited

U.S. PATENT DOCUMENTS

| | | | |
|---|---|---|---|
| 2014/0265032 A1* | 9/2014 | Teicher | B29C 64/40 264/401 |
| 2014/0374958 A1* | 12/2014 | Taniuchi | B29C 64/223 264/401 |
| 2016/0016361 A1* | 1/2016 | Lobovsky | B33Y 50/02 264/308 |
| 2018/0043619 A1* | 2/2018 | Kim | B29C 64/129 |

OTHER PUBLICATIONS

International Preliminary Report on Patentability dated May 27, 2019 issued in corresponding International Application PCT/AT2018/000052 (13 pgs.).

Written Opinion of the International Searching Authority dated Oct. 11, 2018 issued in corresponding International Application PCT/AT/2018/000052 (6 pgs.).

* cited by examiner

METHOD AND DEVICE FOR THE LITHOGRAPHY-BASED ADDITIVE MANUFACTURE OF THREE-DIMENSIONAL MOLDED BODIES

CROSS-REFERENCE TO RELATED APPLICATIONS

This application is the U.S. National Stage of PCT/AT2018/000052, filed Jun. 8, 2018, which claims priority to: European Patent Application No. 17450006.0, filed Jun. 19, 2017, the entire contents of each of which are herein incorporated by reference in their entireties.

The invention relates to a method for the lithography-based additive manufacture of three-dimensional molded bodies, in which a build platform is positioned at a distance from a material support permeable to the radiation of a radiation source at least in some areas for a material solidifiable by exposure to said radiation, wherein the material support is translationally moved between a first position and a second position.

The invention further relates to a device for carrying out such a method.

In lithographic or stereolithographic additive manufacturing, a photopolymerizable starting material is processed in layers to molded bodies. In doing so, the layer information is location- and time-selectively transmitted to the material to be polymerized, either by an optical mask, a projected image area or through screens by means of laser beams. There will be substantial differences in the choice of the exposure and structuring methods: On the one hand, it is possible to expose a (dip) tank of a photopolymerizable material from above, wherein the structured object is successively immersed into the liquid material during the production (SLA), or a material reservoir (a filled material vat) is exposed from below through a transparent vat bottom, wherein the object is removed from the material bath on top (DLP, laser stereolithography). In the latter case, the object is structured layer by layer by moving up and down, the respective distance between the object and the bottom of the material vat ensuring a highly precise layer thickness. In novel processes, this type of structuring may also occur continuously (no alternating up and down movement any longer), in which case, however, further specific requirements must be imposed on the vat bottom. A big advantage of the exposure through the material vat as opposed to the described dipping process (SLA) is, above all, the strongly reduced material amount required for starting the process. Since dipping processes need many liters of the reactive consumable material, they are inherently disadvantageous in terms of handling and process costs.

All of the above-mentioned process techniques have in common the high geometric quality of the additively structured products. Especially in the field of plastics technology, the surface quality is crucial in order to be able to compete with current methods such as injection molding applications. Lithography-based 3D printing thus clearly stands out from all other available 3D printing processes in terms of both surface quality and form quality. What is disadvantageous in this case is the high demand placed on the viscosity of the starting materials (photopolymer mixtures). The currently required dynamic viscosity in the processing stage should, therefore, not exceed some Pa·s (Pascal seconds). This constraint of layered processing drastically limits the selection of qualified photopolymers, to which the greatest weakness of lithography-based additive layering processes is attributed: the frequently strongly limited material properties of the processed plastics.

Especially for technical applications, yet also in the sector of end-user products, it is the material quality of an object that matters in addition to its geometric quality. In additively processed plastics, known deficits primarily are reflected in the temperature resistance (strong loss of stiffness/E module at a temperature increase—usually already above 40-50° C.) and the tenacity (impact strength/resistance to disastrous fracture or tear) at ambient temperature. Stereolithographically processed materials offering a combination of strength, tenacity and efficient temperature resistance (e.g. sufficient stiffness up to 80°) at present are considered to be a prerequisite for a successful and extensive economic integration of additive stereolithography processes in the existing production technology. However, such materials have so far not or only partially been available in the desired quality.

In order to develop novel photopolymer systems for stereolithographic processes, the cited viscosity demands of known processing processes are especially problematic. A possible remedy comprises process control at elevated temperatures. Already a slight increase in the process temperature over normal room temperature (20° C.) will drastically reduce the viscosity of most photopolymers. A considerable increase in the starting polymer substances to choose from will thus be achieved, which will subsequently lead to novel 3D printing materials.

Heated process system applications are already publicly known. Another option for processing higher-viscous systems consists in the process control itself when it may, for instance, come to replacing existing dipping systems (material vats with fill level heights of several millimeters or centimeters) with other material feeding methods (e.g. coating systems). Elevated process temperatures may provide crucial advantages also with these approaches, yet the temperature sensitivity of the photopolymer to be processed will always have to be considered too. The complex heating of individual process elements or even the entire process chamber may be an alternative measure, yet may frequently also result in considerable mechatronic expenditures and, with a wrong implementation, may reduce the long-term stability of the photopolymer mixture and thus considerably jeopardize the process stability.

It is, therefore, the aim of the present invention to find a process control for the processing of highly viscous resins which combines the advantages of selectively heating individual process stages with the advantages of defined material feeding into the respective process zone and which can be implemented as a long-term stable production system.

To solve this object, the invention in a method of the initially defined kind substantially provides that material is applied with a defined layer thickness during the movement of the material support from the first position to the second position, after this the applied material, between the build platform and the material support, is location- and/or time-selectively irradiated by the radiation source and solidified, and subsequently material is removed from the material during the movement of the material support from the second position to the first position.

The present invention comprises a coating and circulating process in which a photosensitive substance can be fed to an exposure zone in the form of thin layers. The process uses a translationally movable material support, which is, for instance, designed as a material vat that serves primarily as a carrier plate for the process-relevant thin layers of the photosensitive material. Photopolymerizable material is fed onto said movable carrier plate, wherein the material may comprise pure photosensitive monomeric or oligomeric compounds, or such compounds including a photoinitiator component. Moreover, such a compound may also be provided with organic or inorganic fillers and/or comprise further organic or inorganic additives or other substances, colorant, absorber materials or otherwise functional or non-functional ingredients. Furthermore, other photopolymerizable substances may also be used, provided a lithographic interaction with this material is possible in the wavelength range between 150 nm and 950 nm.

The material is preferably applied or removed by means of a stationary material introduction device and, in respect to the movable material support, has a fixed process position.

It is preferably provided that the material is applied or removed by means of a first and a second doctor blade.

The first doctor blade is preferably moved away from the material support perpendicularly to the direction of movement of the material support before or during the movement of the material support from the second position to the first position, and is preferably moved towards the material support for adjusting the defined layer thickness during or before the movement of the material support from the first position to the second position. The first doctor blade is designed such that the height of the first doctor blade is variably adjustable in a z-direction (perpendicular to an x-direction, in which the material support is moved), said height adjustment being controllable both by active (e.g. a doctor blade motor) and by passive process mechanisms. The first doctor blade may preferably be adjusted in height so as to not allow for a doctor blade gap between the first doctor blade and the material support in its lowermost position, with the material introduction device thus being completely closed, or to allow for a gap height of a few micrometers up to several millimeters in a raised position.

The second doctor blade forms a removal mechanism and is adjustable in its feed height (z-direction) either passively or actively. It is preferably provided that the second doctor blade is held in abutment on the material support by a return device, e.g. a spring. The material introduction device is thus at any time at least partially sealed relative to the photosensitive material contained therein.

Furthermore, it is preferably provided that a material reservoir is formed between the first and the second doctor blades. In a particularly preferred manner, it is provided the material removed from the material support is at least partially returned into the material reservoir during the movement of the material support from the second position to the first position. In this context it is particularly preferably provided that the material, during the movement of the material support from the first position to the second position, is applied from the material reservoir through a gap defined between the first doctor blade and the material support, with the layer thickness defined by the gap and the translational moving speed of the material support.

The method according to the invention in this case provides a linear movement of the material support below the material introduction device, i.e. below the first doctor blade and the second doctor blade, in such a manner that, in a forth-movement of the material support (i.e. from the first position into the second position), a defined thin layer of the photopolymerizable material is applied onto the material support at least partially, and on parts of the material support, and that in a return-movement of the material support (i.e. from the second position into the first position), the remaining photosensitive material film is drawn off or removed at least partially, and on parts of the material support, whereby, on the one hand, the material support comprises a clean or at least partially cleaned surface in the drawn-off part and, on the other hand, the previously remaining photosensitive material is at least partially returned into the material reservoir.

The applied thin layer of the photosensitive material in the forth-movement of the material support is fed to an exposure zone, in which location- and time-selective exposure information is supplied to the material support from the side facing away from the material. In a preferred embodiment, this is, for instance, accomplished from below, wherein the exposure information has to pass the material support. To this end, the material support is designed to be transparent or at least partially transparent to the light information used. After the exposure and selective hardening of the photopolymerizable material, the latter is drawn off the material support, thus causing non-polymerized residues of the photosensitive material to be present in the form of a discontinuous thin layer, or in the form of material accumulations, material islands or other layer patterns. During the return movement of the material support, this material is again supplied to the material reservoir. To facilitate this, the first doctor blade can be actively or passively lifted during the return movement of the material support to make the passage of the non-polymerized material residues below the first doctor blade easier. After having completed the return movement of the material support, the first doctor blade can be immediately and actively or passively lowered in order to prevent the photopolymerizable material from running out of the material reservoir. During the return movement of the material support, the photosensitive material is peeled off the bottom of the material support by means of the second doctor blade, thus being able to at least temporarily remain in the material reservoir.

The described operation can be repeated as often as needed, thus constantly enabling a freshly applied layer of photopolymerizable material to be applied on the material support and the latter to be subsequently supplied to the exposure zone. The height or thickness of this applied photosensitive material layer can then be steplessly adjusted by the height adjustment of the first doctor blade and by the linear moving speed of the material support. The options for adjusting the height of the photosensitive layer, for instance, range from a few micrometers up to some millimeters. The finally achievable layer thickness of the photosensitive material is, moreover, a function of the viscosity of the photosensitive material and its flow properties, which, in turn, are mostly temperature-dependent. In order to account for this aspect, it is preferably provided that the material is heated in the material introduction device. In a preferred embodiment, all relevant process parts, such as the first and/or second doctor blades and/or the material support, can, moreover, be designed to be heatable in a selective and/or individually adaptable manner.

The build platform used for the stereolithographic printing process proper, which mechanically adjusts (along the z-axis) the layer gap used for the polymerization and which, after the polymerization, ensures the withdrawal of the selectively polymerized material layers from the linearly movable material support, is preferably designed to be heatable.

During the described process, photosensitive stock material is preferably constantly present in the material reservoir. The alternating linear movement of the material support below the material reservoir causes a cyclic movement of the photosensitive stock material in the material reservoir in the form of movable or circulating material waves or material sweeps of the photosensitive material. In order to optimize the process control, it is advantageous to actively or passively detect the material level of the photosensitive stock material either continuously or at defined intervals, which, in the exemplary embodiment according to the invention, can be performed by using an ultrasonic sensor, an optical sensor or a touch sensor. Other non-specified feedback systems such as switches, buttons, fill level probes or similar may also be used for measuring the fill level of the photosensitive stock material. In order to maintain the desired fill level of the photosensitive stock material, it is preferably provided that material is introduced into the material reservoir by means of a conveying device. It may, for instance, be provided that new photosensitive material can be supplied to the material reservoir either continuously or at desired time intervals. The conveying device may be designed to be selectively and individually heatable.

The linearly movable material support may, moreover, actively or passively aid the desired peeling process of the selectively solidified photosensitive material from the material support in the exposure zone in that the linear movement of the material support, combined with an active or passive tilting movement of the entire process setup relative to the build platform, or even combined with an active or passive tilting movement of the build platform itself relative to the process setup, leads to a defined or undefined, multi-axis removal process of the solidified photosensitive material from the material support, such a combined removal movement coming as close as possible to an ideal peeling process. It is, therefore, preferably provided that the build platform tilts during the movement of the material support from the second position to the first position. In a preferred configuration, this peeling process of the selectively hardened photosensitive material layer is determined by the linear lift of the build platform (in the z-direction), the passive or active rotation of the build platform about a pivot point carried along by the build platform and an active or passive linear translational movement of the material support, all in total allowing for a multi-axis peeling process. To aid this peeling process, the material support can be provided with a special anti-adhesive coating and/or comprised of a laminate of various materials transparent, or at least partially transparent, to the used operating wavelength of the photopolymerizable exposure process.

The described process control according to the invention allows for the precise processing of highly viscous photosensitive starting substances that may even have high molecular weights and, at room temperature, may also be present as non-fluid or even solid bodies. Moreover, the described refill system ensures a high process safety, since only such amounts of photosensitive material as are required for a stable pressure process need be available in the process zone. Additional photosensitive stock material can be kept out of the process zone until its use, and possible negative long-term influences by the process temperature or other environmental impacts can be largely prevented. The supply of photosensitive material to the exposure zone in defined thin layers on the material support, moreover, enables the control over possible air inclusions in a layer of the solidified photopolymer. Via the linear moving speed of the material support, the fill level of the photosensitive material in the material reservoir, and the moving height of the doctor blade, it is also possible to influence the cyclically revolving material sweeps in the material reservoir with a view to optimizing the mixing of fresh photosensitive material with photosensitive material already drawn off the material support and minimizing the undesired introduction of air or gas bubbles into the stock material in the material reservoir.

According to a further aspect of the invention, a device for the lithography-based additive manufacture of three-dimensional molded bodies is provided, comprising a radiation source of electromagnetic radiation, a material support permeable to the radiation of the radiation source at least in some areas for a material solidifiable by exposure to said radiation, a build platform held at a distance from the material support, wherein the material support is translationally movable between a first position and a second position, characterized in that a material introduction device is provided, which is designed to apply material with a defined layer thickness during the movement of the material support from the first position to the second position, and to remove material from the material support during the movement of the material support from the second position to the first position.

It is preferably provided that the material introduction device comprises at least a first and a second doctor blade, the first doctor blade preferably being height-adjustable perpendicularly to the direction of movement of the material support.

Furthermore, it is preferably provided that the second doctor blade cooperates with a return element, e.g. a spring.

In a preferred configuration, it is provided that the build platform is arranged to be tiltable.

It is preferably provided that the material introduction device comprises a heating device for heating the material.

Furthermore, it is preferably provided that a material reservoir is formed between the first and the second doctor blades, which are preferably arranged in parallel with each other.

It is preferably provided that the material reservoir is connected to a conveying device so as to enable material to be introduced into the material reservoir.

In the following, the invention will be explained in more detail by way of exemplary embodiments schematically illustrated in the drawing. Therein, FIGS. 1 and 2 depict schematic lateral sectional views of a device according to the invention in successive phases of the process cycle.

Figure 2:
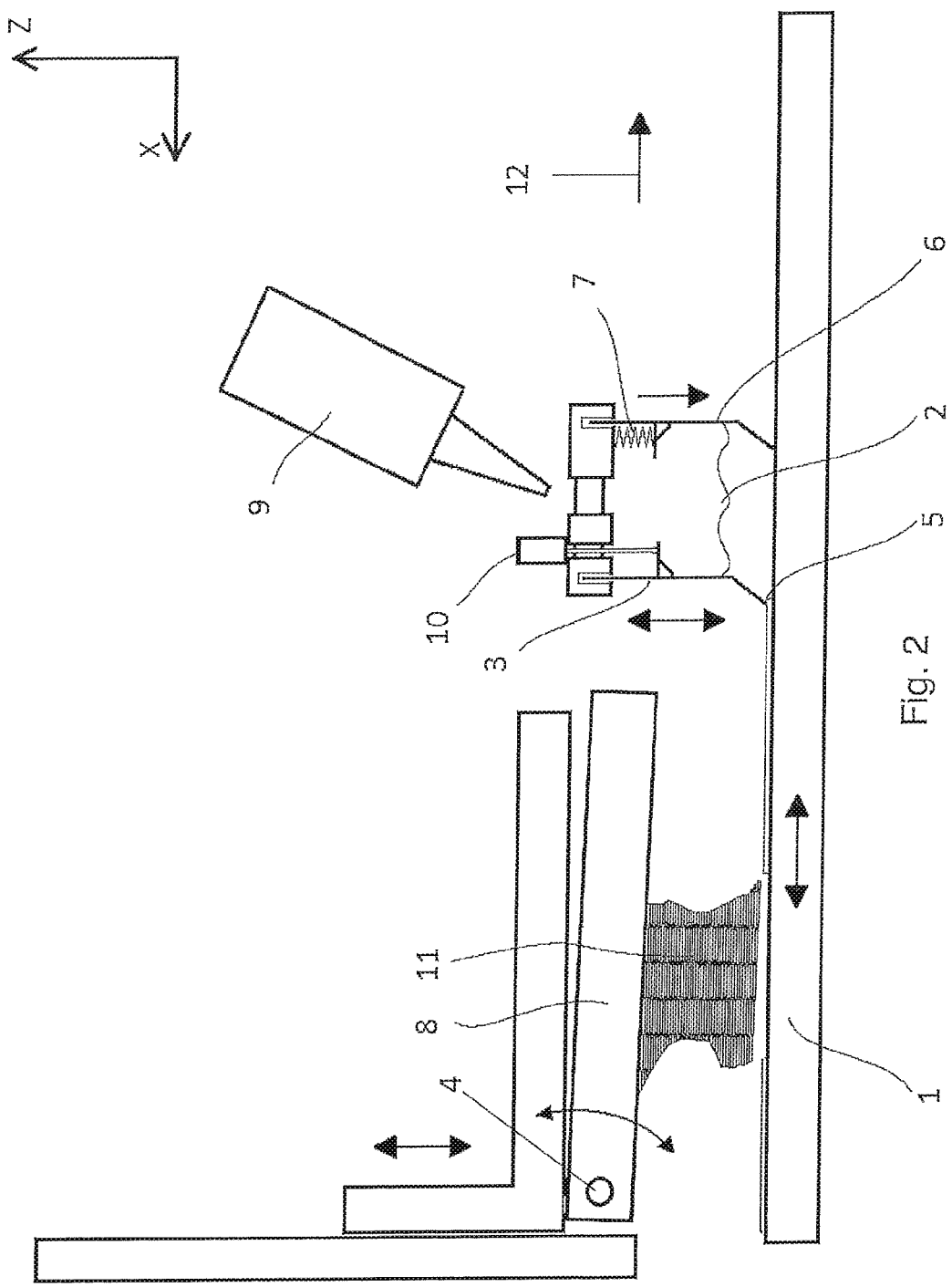

In FIG. 1, a material support is denoted by 1, on which a material layer 11 is disposed. At a distance from the material support 1 a build platform 8 is arranged that is height-adjustable in the z-direction and mounted so as to be tiltable about an axis 4. Some material layers 11 have already been constructed between the build platform 8 and the material support 1. The material support 1 is translationally movable along the x-direction, which is perpendicular to the z-direction.

Furthermore, a material introduction device 3 comprising a first doctor blade 5 and a second doctor blade 6 is provided. The first doctor blade 5 is height-adjustable in the z-direction by means of a doctor blade motor 10, and the second doctor blade 6 comprises a spring 7 holding the second doctor blade 6 in abutment on the material support 1 in the z-direction. A material reservoir 2, which can be supplied with material by a conveying device 2, is formed between the two doctor blades 5,6.

In the phase illustrated in FIG. 1 of the method, the material support 1 is in the second position. The build platform 8 is lowered in the direction of the material support 1 such that a new material layer 11 can be formed by location-selectively irradiating, and solidifying, the material layer 11 on the material support 1 by means of a radiation source (not illustrated) from below through the material support 1. The material layer 11 was applied by the first doctor blade 5 during the movement of the material support 1 into the second position.

FIG. 2 depicts the phase after completion of the solidification of the material layer 11. The material support 1 now moves in the sense of arrow 12, away from the second position in the direction towards the first position. At the same time, the build platform 8 is slightly raised in the z-direction, wherein the combined lifting movement of the build platform 8 and the movement of the material support 1 in the sense of arrow 12 causes tilting of the build platform 8 about the axis 4 so as to promote the multi-axial detachment of the finished material layers 11 from the material support 1 in the manner of a peeling process. To this end, the position of the axis 4 on the build platform 8 can also be located on the opposite side of the build platform 8, viewed in the x-direction, if this additionally favors the peeling process. During the movement of the material support from the second into the first positions, the material 11 remaining on the material support 1 is stripped off by the second doctor blade 6 and thus again collected in the material reservoir 2, and optionally supplemented with fresh material by the conveying device so as to provide sufficient material at any time.

After the material layer 11 has been stripped off by the second doctor blade 6 and the material support 1 has arrived in the first position, a material layer 11 is again applied from the material reservoir 2 by the first doctor blade 5 by moving the material support 1 towards the second position against the sense of arrow 12, until the second position depicted in FIG. 1 is reached. After this, the build platform and the structure formed by the already solidified layers 11, respectively, are lowered into the material layer for adjusting the layer thickness to be solidified, whereupon further exposure and solidification of the material layer 11 can be performed.

The invention claimed is:

1. A method for lithography-based additive manufacture of three-dimensional molded bodies, in which a build platform is positioned at a distance from a material support, which is permeable to radiation of a radiation source at least in some areas, for a material solidifiable by exposure to said radiation, wherein the method comprises:
   translationally moving the material support between a first position and a second position,
   applying the material with a defined layer thickness during a translational forth-movement of the material support from the first position to the second position, and, thereafter,
   location- and/or time-selectively irradiating, by the radiation source, the applied material between the build platform and the material support and solidifying the applied material, and subsequently
   removing the applied material from the material support during a translational return-movement of the material support from the second position to the first position,
   wherein the translational forth-movement and the translational return-movement of the material support take place in the same plane, and characterized in that the material is applied and/or the applied material is removed by a first doctor blade and a second doctor blade.

2. The method according to claim 1, characterized in that the material is applied and/or the applied material is removed by means of a stationary material introduction device.

3. The method according to claim 1, characterized in that the first doctor blade is moved away from the material support perpendicularly to the direction of movement of the material support before or during the movement of the material support from the second position to the first position, and is moved towards the material support for adjusting the defined layer thickness during or before the movement of the material support from the first position to the second position.

4. The method according to claim 1, characterized in that a material reservoir is formed between the first doctor blade and the second doctor blade.

5. The method according to claim 4, characterized in that the material, during the movement of the material support from the first position to the second position, is applied from the material reservoir through a gap defined between the first doctor blade and the material support, with the defined layer thickness being defined by the gap and a translational moving speed of the material support.

6. The method according to claim 4, characterized in that the material is introduced into the material reservoir by means of a conveying device.

7. The method according to claim 4, characterized in that the applied material removed from the material support is at least partially returned into the material reservoir during the movement of the material support from the second position to the first position.

8. The method according to claim 1, characterized in that the second doctor blade is held in abutment on the material support by a return device.

9. The method according to claim 1, characterized in that the build platform tilts during the movement of the material support from the second position to the first position.

10. The method according to claim 2, characterized in that the material and/or the applied material is heated in the stationary material introduction device.

11. A device for lithography-based additive manufacture of three-dimensional molded bodies, comprising: a radiation source configured to provide radiation, a material support, which is permeable to the radiation of the radiation source at least in some areas, for material solidifiable by exposure to said radiation, and a build platform held at a distance from the material support,
   wherein the material support is configured to be translationally movable between a first position and a second position,
   characterized in that a material introduction device is provided, which comprises at least a first doctor blade and a second doctor blade,
   the device further comprising a material reservoir that is filled with the material and is formed between the first doctor blade and the second doctor blade,
   the material introduction device being designed to apply the material with a defined layer thickness during a translational forth-movement of the material support from the first position to the second position, and to remove the applied material from the material support during a translational return-movement of the material support from the second position to the first position,
   wherein the translational forth-movement and the translational return-movement of the material support take place in the same plane, and wherein the material is configured to be applied and/or the applied material is removed using the first doctor blade and the second doctor blade,
   wherein the radiation source is configured to location- and/or time-selectively irradiate the applied material between the build platform and the material support and solidify the applied material before removal of the applied material.

12. The device according to claim 11, characterized in that the first doctor blade being height-adjustable perpendicularly to the direction of movement of the material support.

13. The device according to claim 12, characterized in that the second doctor blade cooperates with a return element.

14. The device according to claim 11, characterized in that the build platform is arranged to be tiltable.

15. The device according claim 11, characterized in that the material introduction device comprises a heating device for heating the material.

16. The device according to claim 11, characterized in that the material reservoir is connected to a conveying device so as to enable the material to be introduced into the material reservoir.

\* \* \* \* \*

UNITED STATES PATENT AND TRADEMARK OFFICE
CERTIFICATE OF CORRECTION

PATENT NO. : 11,426,926 B2  
APPLICATION NO. : 16/622566  
DATED : August 30, 2022  
INVENTOR(S) : Robert Gmeiner et al.

It is certified that error appears in the above-identified patent and that said Letters Patent is hereby corrected as shown below:

On the Title Page

Item (22) PCT Filed: delete "Jun. 8, 2018" and insert -- Jun. 7, 2018 --

Signed and Sealed this  
Twenty-fifth Day of November, 2025

John A. Squires  
*Director of the United States Patent and Trademark Office*